No. 675,822. Patented June 4, 1901.
C. B. DURYEA.
METHOD OF MANUFACTURING THIN BOILING STARCH.
(Application filed Jan. 12, 1899.)
(No Model.)
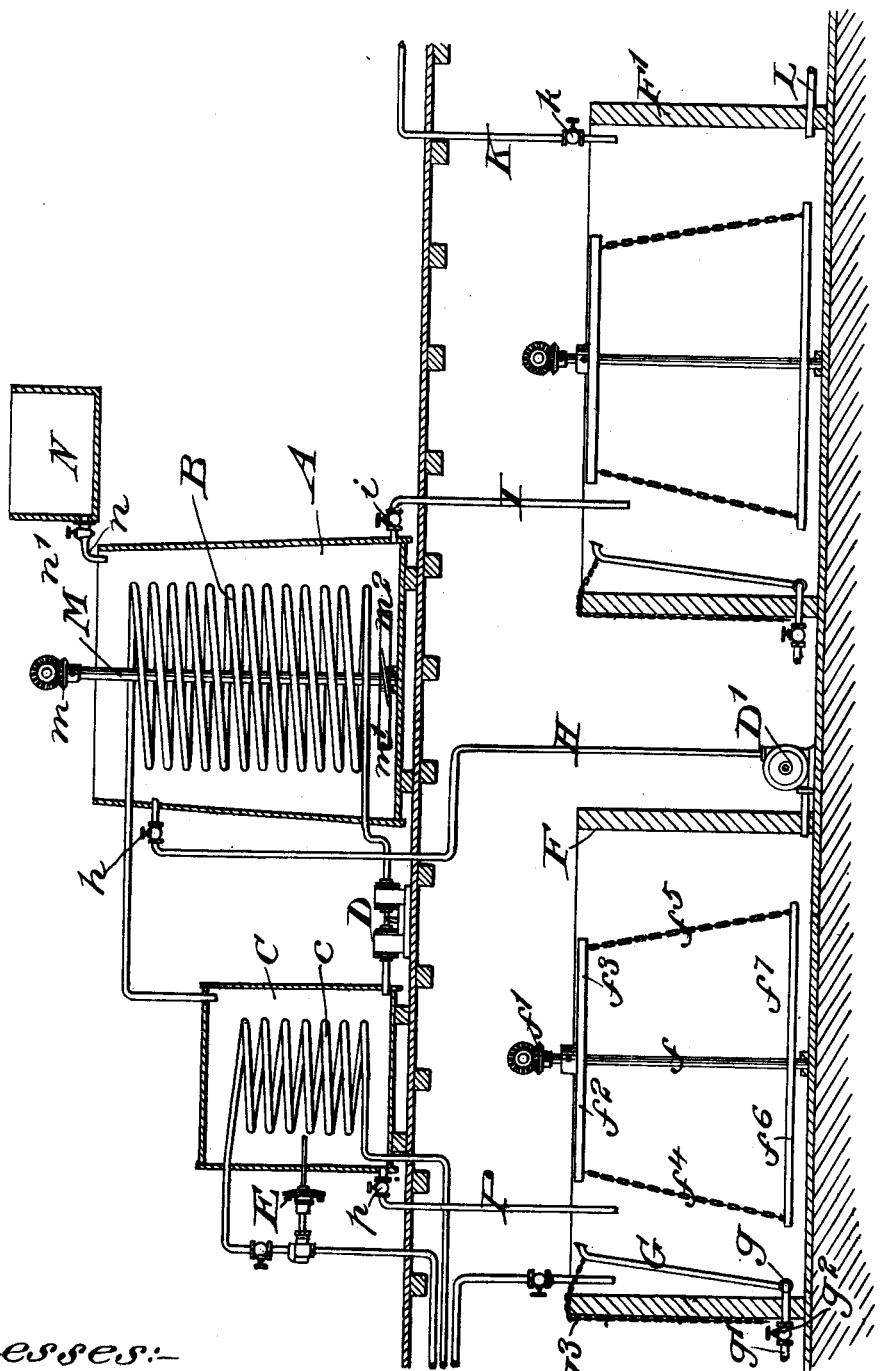
Witnesses:—
George Barry Jr.
Fred Haynes
Inventor:—
Chester B. Duryea
By Brown & Seward
his Attorneys

UNITED STATES PATENT OFFICE.

CHESTER B. DURYEA, OF NEW YORK, N. Y.

METHOD OF MANUFACTURING THIN BOILING-STARCH.

SPECIFICATION forming part of Letters Patent No. 675,822, dated June 4, 1901.

Application filed January 12, 1899. Serial No. 701,909. (No specimens.)

*To all whom it may concern:*

Be it known that I, CHESTER B. DURYEA, a citizen of the United States, and a resident of New York, in the county and State of New York, have invented a new and useful Improvement in the Method of Manufacturing Thin Boiling-Starch, of which the following is a specification.

My invention relates to an improvement in the method of manufacturing thin boiling starch, with the object in view of providing a high-grade quality of starch of this character in an expeditious manner.

Ordinary starches when boiled with water to prepare starch paste or solution for laundry or other use give exceedingly viscous and colloidal solutions. For some purposes, particularly for steam-laundry use, it is highly desirable to have starches of a less viscous and colloidal character. My present invention is directed to a starch of this latter character, and consists, broadly, in treating the starch-granules with acid for the purpose of destroying, to a material extent, the viscous and colloidal character of the granules without materially destroying their integrity.

The accompanying drawing represents a practical embodiment of an apparatus for carrying my method into practical effect, the connected and coacting parts being shown in vertical section.

The method or process may be more specifically described as follows:

While not limiting myself to any particular starch, I will describe the process with reference to corn-starch, which may be extracted from the corn by any of the usual methods.

The starch to be operated upon may be taken at any stage of the usual starch process after the corn is ground and sieved—viz., after the starch is roughly separated from the coarser portions of the grain. In fact, the corn itself could be operated upon before grinding; but I prefer in order to obtain a pure product and for reasons of economy not to operate upon the starch until it has reached that stage of the ordinary process where the starch is ready for washing and drying. This step is that of the ordinary starch process at which the starch has been to a great extent refined or separated from the nitrogenous, fatty, and cellular portions of the corn. The starch thus prepared is first put in suspension in water, which may be done by any convenient and ordinary method. It may be of any convenient specific gravity; but I prefer a gravity of from 12° to 15° Baumé. I also prefer to put the starch in suspension in warm water, for reasons which will hereinafter be more particularly explained in connection with the explanation of the apparatus.

The next step in the process is making the water in which the starch is held in suspension acid to the extent of about one-half to two per cent., by weight, of free acid. This may be done either before or after the water in the converter is raised to its efficient working temperature. I prefer to use sulfuric acid, although other acid—such, for example, as hydrochloric or oxalic acid—might be used. I also prefer to remove the suspended starch from the vessel or tank in which it is first placed in suspension into a separate vessel, which I call, for convenience, the "converter," although this is not necessary, as the converter might be itself used for the purpose of first placing the starch in suspension. The per cent. of acid which I prefer in practice is about one per cent. While in the converter the starch is kept in suspension and the acid thoroughly distributed by continuous agitation and the temperature raised by suitable heating means to about 55° centigrade. The exact temperature is not essential to the process; but it should not reach a point higher than 60° centigrade, because of the danger of dissolving and swelling the starch; but the nearer the mass can be kept to 60° without materially exceeding that temperature the more rapid will the process be. As soon as the acid is added it begins action on the starch-granules; but at ordinary temperatures the process would be much too slow for practical purposes, while if the acidified starch liquor is raised to between 55° and 60° centigrade the effect of the acid on the granules is rapid, completing in from one-half to four and one-half hours the operation which at ordinary temperatures would require days or even, perhaps, weeks to complete.

The times for completing the operations are not uniform for starches of different characters; but knowing the character of the starch being operated upon, the percentage of acid employed, and the temperature maintained in the converter, the time for a predetermined product will be uniform for each successive charge in the converter.

The operator may follow the progress of the operation by withdrawing samples from the converter from time to time, filtering, cooling, and testing with a weak solution of iodin, and the intensity of the test when made under the same relative conditions will vary directly in proportion to the progress of the operation. A small amount of experience will thus enable the operator to stop the operation at the proper point. When this is reached, the heating is discontinued and the charge in the converter is submitted to washing either in the converter itself or, preferably, in a separate vessel, to which it is removed from the converter.

After the acid has been thoroughly washed out of the starch the latter may be placed in suspension in water sufficient to make it convenient for the final molding and drying in the usual manner.

The theory of the action of the acid upon the starch-granules may be explained as follows: Starch as a mass is made up of minute granules which have a concentrically-stratified structure somewhat similar to that of an onion. These granules consist, mainly, of a substance known as "granulose," together with a closely-allied substance known as "starch" or "amylo" cellulose. The greater proportion of the starch-cellulose occurs in the outer layers of the granules and probably constitutes wholly the external coat. The granulose, although by itself slightly soluble in cold water, is highly collodial, and therefore, owing to the protecting-coating of cellulose, which is quite insoluble in cold water, the starch-granules are wholly unacted upon by this menstruum. The effect of dilute acid is to penetrate without changing the character of the amylo-cellulose and attack the granulose, changing it in the first stage of the action into merely a less viscous, more soluble, and a somewhat less colloidal modification. The first change is more of a physical than a chemical one. As the formula of starch is $C_6H_{10}O_{5n}$, this change may be expressed by saying that the value of "n" has been decreased and that the size of the starch-granulose molecules has become smaller. If the action of the dilute acid is allowed to continue, the granulose will be broken down more and more until finally the changed granulose may be in this way extracted from the unbroken and practically-unchanged cellulose, and as the viscous and colloidal character of starch paste is due mainly to the proportion and character of the granulose of the starch-granules it is evident that the strong starch may be thus weakened without incurring any considerable loss of starch substance so long as the action of the acid is properly controlled.

Turning now to the apparatus which I prefer to employ for carrying the process into practical effect, A represents the converter, in which the starch is held in suspension while being treated with the acid, and the particular means for maintaining the temperature within the converter A at a predetermined degree is here shown as a pipe-coil B. The opposite ends of the pipe-coil B communicate directly with the interior of a closed hot-water tank C. A force-pump (shown diagrammatically at D) is connected with the pipe of the coil B in order to maintain the circulation of water from the tank C through the pipe-coil. The water in the tank C is maintained at the desired temperature preferably by means of a steam-coil $c$ within the tank C, the control of the steam to the coil C from a source of supply (not shown) being determined by a thermostat or regulator E of any well-known or approved form.

A tank F for receiving the starch to be treated is provided with an agitator consisting in the present instance of an upright shaft $f$, provided with gear $f'$, driven from a source of power, (not shown,) and further provided with laterally-extending arms $f^2 f^3$, secured to rotate with the shaft and having suspended by chains $f^4 f^5$ at their opposite ends arms $f^6 f^7$, loosely connected with the shaft $f$. The tank F is further provided with a siphon draw-off tube G, pivotally connected at its lower end, as at $g$, with an exit-pipe $g'$, provided with a stop-cock $g^2$, the said draw-off tube G being suspended at its upper end by means of a chain or cord $g^3$ to permit its free open end to be lowered within the tank to draw off the liquid as far as desired.

From the tank F a pipe H leads to the converter A and is provided with a force-pump (shown diagrammatically at D') for forcing the contents or a portion of the contents of the tank F into the converter A at pleasure. The force-pump D' is driven from a source of power. (Not shown.) The pipe H is provided with a stop-cock $h$.

A second tank, F', for receiving the treated starch from the converter A is fitted with an agitator and draw-off tube in a manner quite similar to the tank F hereinabove described.

A pipe I leads from the bottom of the converter A to the tank F' and is provided with a stop-cock $i$. The pipe K for the admission of water to the tank F' for washing the treated starch leads to the tank F' from a supply (not shown) and is provided with a stop-cock $k$. The tank F' is further provided with a draw-off pipe L.

The converter A is provided with an agitator comprising an upright shaft M, provided with gear $m$, by means of which it is driven from a source of power. (Not shown.) The shaft M is further provided in the present instance at a point below the coil B with blades $m' m^2$, preferably made somewhat like propeller-blades, for the purpose of keeping the mass within the converter constantly and thoroughly agitated.

The acid may be contained in a properly-diluted state in a tank N, located conveniently with respect to the converter A, so that the proper charge may be drawn from the tank N through its spout $n$ into the converter A. A cock $n'$ is provided to control the flow of dilute acid into the converter.

The apparatus is practically operated as follows: The starch to be treated is put in suspension in water in the tank F, the water employed for this purpose being preferably drawn from the hot-water tank C through a pipe P, provided with a stop-cock $p$. The reason for using the warm water for putting the starch first in suspension is that it materially reduces the time required for raising the charge in the converter to the temperature of greatest efficiency. When the starch has become thoroughly commingled with the water in suspension and the lumps thoroughly broken up, a charge is forced by the pump D' from the tank F into the converter A. The proper percentage of acid is then drawn from the tank N into the converter A, and while the mass is kept thoroughly agitated the temperature of the mass within the tank A is raised to from 55° to 60° centigrade and maintained at about that temperature by the action of the pump D forcing the hot water from the tank C through the coil B until the operation of acid treatment is completed. The circulation of the hot water is then stopped, and the charge is drawn from the converter A into the washing-tank F', where it is washed one or more times with cold water drawn into the tank through the pipe K. After the starch has been thoroughly washed enough clear water is introduced to cause it to flow through the exit-pipe L into the molds or driers, as is usual.

What I claim is—

The method of making a thin boiling-starch consisting in treating the starch mixed with water with acid while the starch is held in a free-flowing state of suspension and maintained at a degree of temperature as high as practicable without breaking down the starch-granules and subsequently while the mixture is still held in suspension removing the acid, substantially as set forth.

In testimony that I claim the foregoing as my invention I have signed my name, in presence of two witnesses, this 5th day of January, 1899.

CHESTER B. DURYEA.

Witnesses:
FREDK. HAYNES,
EDWARD VIESER.